US012684642B2

(12) United States Patent
Wu et al.

(10) Patent No.: US 12,684,642 B2
(45) Date of Patent: *Jul. 14, 2026

(54) METHOD AND APPARATUS FOR REESTABLISHMENT AND MOBILITY OPTIMIZATION (MRO) IN A WIRELESS COMMUNICATION SYSTEM

(71) Applicant: LENOVO (BEIJING) LIMITED, Beijing (CN)

(72) Inventors: Lianhai Wu, Beijing (CN); Mingzeng Dai, Shanghai (CN); Hongmei Liu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 613 days.

This patent is subject to a terminal disclaimer.

(21) Appl. No.: 18/040,055

(22) PCT Filed: Jul. 31, 2020

(86) PCT No.: PCT/CN2020/106269
§ 371 (c)(1),
(2) Date: Jan. 31, 2023

(87) PCT Pub. No.: WO2022/021351
PCT Pub. Date: Feb. 3, 2022

(65) Prior Publication Data
US 2023/0319938 A1 Oct. 5, 2023

(51) Int. Cl.
*H04W 36/30* (2009.01)
*H04W 76/19* (2018.01)
*H04W 76/20* (2018.01)

(52) U.S. Cl.
CPC ........... *H04W 76/19* (2018.02); *H04W 76/20* (2018.02)

(58) Field of Classification Search
CPC . H04W 76/19; H04W 76/20; H04W 36/0033; H04W 36/00; H04W 40/36;
(Continued)

(56) References Cited

U.S. PATENT DOCUMENTS

2020/0351694 A1* 11/2020 Chen .................... H04W 36/362
2021/0014922 A1* 1/2021 Chen ..................... H04W 76/19
(Continued)

FOREIGN PATENT DOCUMENTS

CN 102457941 A 5/2012
CN 110290530 A 9/2019
(Continued)

OTHER PUBLICATIONS

International Search Report and Written Opinion dated Apr. 21, 2021 for International Application No. PCT / CN2020/106269.

*Primary Examiner* — Mewale A Ambaye
(74) *Attorney, Agent, or Firm* — AMPACC Law Group, PLLC

(57) ABSTRACT

Embodiments of the present disclosure relate to methods and apparatuses for reestablishment in a wireless communication system. According to some embodiments of the present disclosure, a method includes: receiving, at a user equipment (UE) from a first base station (BS), conditional reestablishment configuration information indicating a set of execution conditions for a set of candidate cells; and evaluating the set of execution conditions based on the conditional reestablishment configuration information in response to the reception of conditional reestablishment configuration information. The leaving indication is sent to the serving cell in response to the initiation of the conditional reestablishment. The RLF report is reported in response to the failure of conditional reestablishment or an RLF event when the conditional reestablishment is configured.

19 Claims, 11 Drawing Sheets

600

(58) Field of Classification Search
CPC ... H04W 52/02; H04W 48/20; H04W 36/305;
H04W 36/00835; H04W 36/304
See application file for complete search history.

(56) References Cited

U.S. PATENT DOCUMENTS

| | | | |
|---|---|---|---|
| 2021/0136638 A1* | 5/2021 | Paladugu ........ | H04W 36/00837 |
| 2022/0030485 A1* | 1/2022 | Kim ................ | H04W 36/00837 |
| 2023/0388871 A1* | 11/2023 | Guo .................. | H04W 36/0069 |

FOREIGN PATENT DOCUMENTS

| | | | |
|---|---|---|---|
| CN | 110351805 A | 10/2019 | |
| CN | 110831082 A | 2/2020 | |
| WO | 2020100053 A1 | 5/2020 | |

* cited by examiner

METHOD AND APPARATUS FOR REESTABLISHMENT AND MOBILITY OPTIMIZATION (MRO) IN A WIRELESS COMMUNICATION SYSTEM

CROSS REFERENCE TO RELATED APPLICATIONS

This application is a national phase entry of International Application No. PCT/CN2020/106269, filed on Jul. 31, 2020, which is incorporated by reference in its entirety.

TECHNICAL FIELD

Embodiments of the present disclosure generally relate to wireless communication technology, especially to reestablishment and mobility robustness optimization (MRO) in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

A communication link can be established in a wireless communication system to provide a service(s) (e.g., voice, data, or other(s)) to a user equipment (UE). However, the communication link may fail due to various factors. When a link failure is detected, the UE can request communication link reestablishment, either the previous communication link or a new communication link. The method of reestablishing the communication link can include, for example, performing a reestablishment procedure with a base station (BS), to maintain continuity of the service(s).

The industry desires technologies for improving a reestablishment procedure(s) on the market and performing a MRO mechanism during the reestablishment procedure(s).

SUMMARY

An embodiment of the present disclosure provides a method. The method may include: receiving, at a user equipment (UE) from a cell of a first base station (BS), conditional reestablishment configuration information indicating a set of execution conditions for a set of candidate cells; and evaluating the set of execution conditions based on the conditional reestablishment configuration information in response to the reception of conditional reestablishment configuration information.

Another embodiment of the present disclosure provides a method. The method may include transmitting, at a user equipment (UE), a measurement report; and receiving a reestablishment command indicating at least one candidate cell.

Another embodiment of the present disclosure provides a method. The method may include transmitting, from a cell of a first base station (BS) to a user equipment (UE), conditional reestablishment configuration information indicating a set of execution conditions for a set of candidate cells.

Another embodiment of the present disclosure provides a method. The method may include receiving, from a user equipment (UE), a measurement report; and transmitting a reestablishment command indicating at least one candidate cell based on the measurement report.

Another embodiment of the present application provides an apparatus. The apparatus includes: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any of the above-mentioned methods.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE), and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
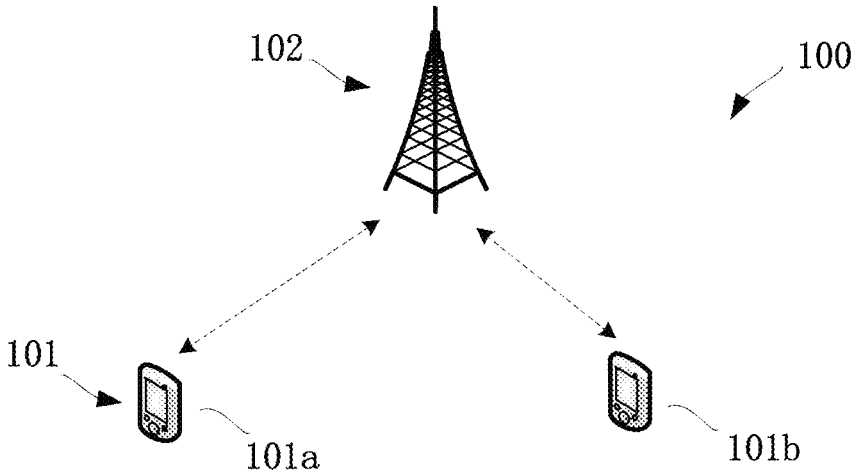
FIG. 1 is a schematic diagram illustrating an exemplary wireless communication system according to some embodiments of the present disclosure.

FIG. 1 is a schematic diagram illustrating an exemplary wireless communication system 100 according to some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs 101 and BSs 102 may be included in the wireless communication system 100.

The UE(s) 101 may be any type of device configured to operate and/or communicate in a wireless environment. For example, a UE 110 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, internet-of-things (IoT) devices, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with BSs 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS 102. The BS 102 may communicate with UE(s) 101 via downlink (DL) communication signals.

The BS 220 may be configured to transmit and/or receive wireless signals within a particular geographic region, which may be referred to as a cell (not shown in FIG. 1). In some cases, the geographic region for a base station may be divided into sectors, each making up a portion of the geographic region. The term "cell" may refer to a portion of the geographic region (e.g., a sector).

The BS 102 may be in communication with a core network (not shown in FIG. 1). The core network (CN) may include a plurality of core network components, such as a mobility management entity (MME) (not shown in FIG. 1) or an access and mobility management function (AMF) (not shown in FIG. 1). The CNs may serve as a gateway for the UEs to access a public switched telephone network (PSTN) and/or other networks (not shown in FIG. 1).

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

To extend the coverage and availability of wireless communication systems (e.g., 5G systems), spaceborne vehicles and airborne vehicles may be utilized in communications related to ground devices such as user equipment (UE). A network or a segment of a network using a spaceborne or airborne vehicle may be referred to as a non-terrestrial network (NTN). A spaceborne vehicle may include a satellite, such as a low earth orbiting (LEO) satellite, a medium earth orbiting (MEO) satellite, a geostationary earth orbiting (GEO) satellite, and a highly elliptical orbiting (HEO) satellite. An airborne vehicle may include a high altitude platform (HAP) encompassing an unmanned aircraft system (UAS). A UAS may include a lighter than air UAS (LTA) and a heavier than air UAS (HTA), which may operate in altitudes such as between 8 and 50 km and may be quasi-stationary. In a NTN, some or all functions of a base station (BS) may be deployed in a satellite or an airborne vehicle.

Figure 2:
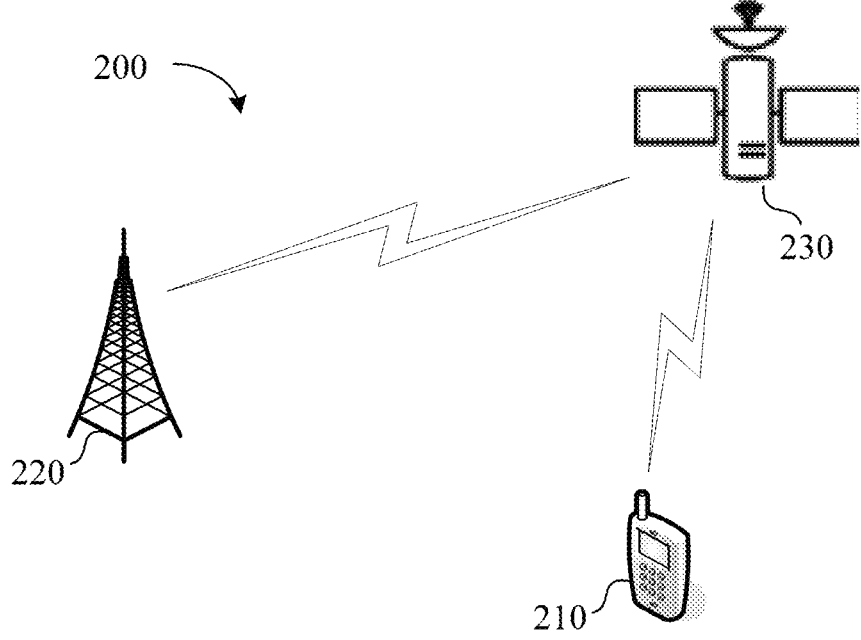
FIG. 2 is a schematic diagram illustrating an exemplary wireless communication system according to some embodiments of the present disclosure.

FIG. 2 is a schematic diagram illustrating an exemplary wireless communication system 200 according to some embodiments of the present disclosure.

As shown in FIG. 2, a wireless communication system 200 may include one or more UEs (e.g., UE 210), one or more BSs (e.g., BS 220), one or more radio access networks (RANs) (e.g., RAN 221), and one or more satellites (e.g., satellite 230). It is contemplated that the wireless communication system 200 may include any number of UEs, BSs, satellites, networks, and/or network components.

The UE 210 may function as the UE 101*a* or UE 101*b* shown in FIG. 1 and the BS 220 may function as the BS 102 shown in FIG. 1. Some or all functions of a base station may be deployed in satellite 230. In some cases, a satellite 230 may be also referred to as a base station.

Referring to FIG. 2, the satellite 230 may be in communication with the BS 220 and the UE 210. In some examples, the BS 220 may utilize the satellite 230 to relay communications to the UE 210. In some examples, the UE 210 may be connected to a core network (not shown in FIG. 1) via the satellite 130. The concept of cell with respect to a BS may similarly apply to a satellite. For example, a satellite may generate beams over a certain service area, which may be referred to as a cell.

Although a NTN application scenario is depicted in FIG. 2, it is contemplated that a NTN may be applied in other different scenarios and may have a structure different from the structure as illustrated in FIG. 2.

Narrowband (NB) IoT (NB-IoT) is a radio access technology that can provide a connection to network services by a physical layer optimized for very low power consumption (e.g., full carrier bandwidth can be 180 kHz, subcarrier spacing can be 3.75 kHz or 15 kHz).

NB-IoT radio access technology is introduced in 3GPP release 13 to provide internet-of-things (IoT) services to massive numbers of devices using narrow system bandwidth (e.g., as narrow as 200 kHz). 3GPP release 14 adds enhancements in the form of support for higher data rates, multicast, positioning, a lower power UE class, and system access on non-anchor carriers. 3GPP release 15 introduces further enhancements in the form of support for improved latency, power consumption, measurement accuracy, cell range, and load control. To extend the range of deployment options, 3GPP release 15 also specifies small cell and time division duplexing (TDD) support for NB-IoT.

NB-IoT is a fast-growing wireless technology and has been a commercial success. The number of deployed networks and the volume of connected devices are undergoing steady growth. To support this growth, in 3GPP release 16, NB-IoT is enhanced to further improve the network operation and efficiency in a range of areas. In some examples, a number of E-UTRA protocol functions supported by release 8 UEs may not be used for NB-IoT, and thus need not be supported by BSs and UEs only using NB-IoT.

Figure 3:
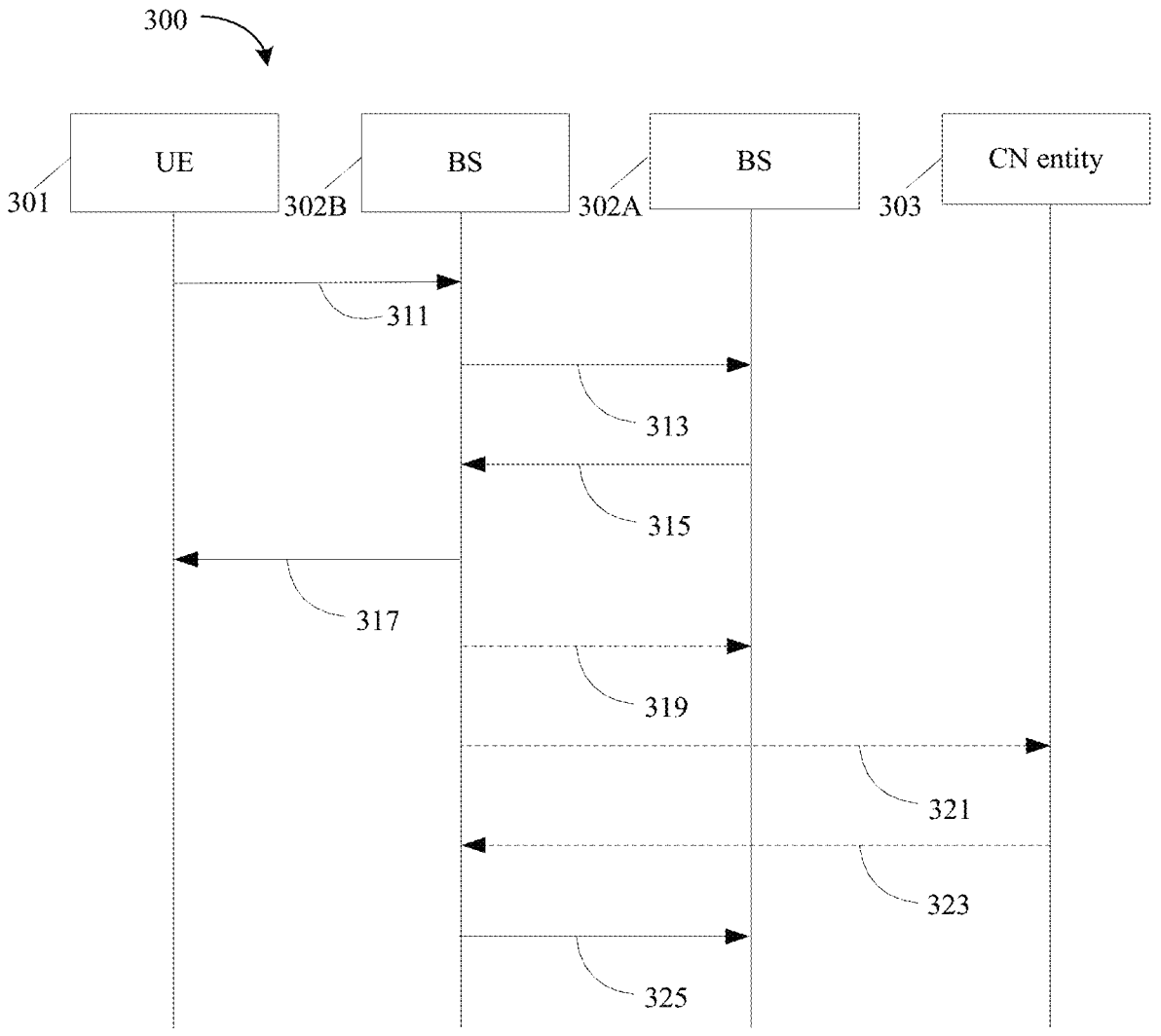
FIG. 3 illustrates a flow chart of an exemplary reestablishment procedure according to some embodiments of the present disclosure.

FIG. 3 illustrates a flow chart of an exemplary reestablishment procedure 300 according to some embodiments of the present disclosure. Details described in all of the foregoing embodiments of the present disclosure are applicable for the embodiments shown in FIG. 3.

The procedure in FIG. 3 may occur, for example, in response to a radio link failure (RLF) on a radio link between UE 301 and BS 302A (i.e., source BS). The UE 301 may select a target BS (e.g., BS 302B) to reestablish the radio link. The BS 302A and the BS 302B may operate or work under the control of a CN entity (e.g., CN entity 303). The UE 301 may function as the UE 101*a* or UE 101*b* shown in FIG. 1, or UE 210 shown in FIG. 2. The BS 302A and BS 302B may function as the BS 102 shown in FIG. 1, or BS 220 or satellite 230 shown in FIG. 2. The CN entity 303 may be a MME or AMF.

In operation 311, the UE 301 may transmit a radio resource control (RRC) reestablishment request message to the BS 302B. The RRC reestablishment request message may include information that can identify UE 301, such as the Physical Cell ID (PCI) of the BS 302A and the Cell Radio Network Temporary Identifier (C-RNTI) identifying the UE 301 at the BS 302A. The UE 301 may start a timer (e.g., T301) associated with the reestablishment request message in response to the transmission of the RRC reestablishment request message.

The BS 302B may try to identify the source BS of the UE 301 based on the PCI. In the case that the BS 302B identifies the source BS (e.g., BS 302A) of the UE 301, the BS 302B may transmit, in operation 313, a request to the BS 302A to retrieve the UE context of the UE 301 if the UE context is not available at the BS 302B. The request may be transmitted in a retrieve UE context request message. The retrieve UE context request message may include the PCI of the BS 302A, the C-RNTI of the UE 301, and an evolved universal terrestrial radio access network (E-UTRAN) cell identifier of the BS 302B.

In the case that the BS 302A matches the UE context with the PCI and the E-UTRAN cell identifier in the retrieve UE context request message, the BS 302A may transmit, in operation 315, a retrieve UE context response message to the BS 302B. The retrieve UE context response message may include the UE context of the UE 301.

In some embodiments of the present disclosure, operations 313 and 315 may be omitted if the UE context of the UE 301 is available at the BS 302B. For example, the BS 302B and the BS 302A may be the same BS, and the UE 301 may try to access a different or the same cell of the same BS. In this example, the UE context of the UE 301 is available at the target BS, and thus operations 313 and 315 are omitted.

In operation 317, the BS 302B may transmit an RRC reestablishment message to the UE 301. The UE 301 may stop the timer (e.g., T301) associated with the RRC reestablishment request message in response to the RRC reestablishment message. In operation 325, the BS 302B may transmit a UE context release message to the BS 302A to trigger the release of the UE resources associated with the UE 301 at the BS 302A.

In some embodiments of the present disclosure, the procedure 300 may further include operation 319 (denoted by dotted arrow as an option). In operation 319, the BS 302B may provide a forwarding address to the BS 302A. The BS 302A may transmit the downlink user data buffered in the BS 302A to the forwarding address to prevent loss of data.

In some embodiments of the present disclosure, the procedure 300 may further include operations 321 and 323 (denoted by dotted arrow as an option). In operation 321, the BS 302B may transmit a path switch request message to the CN entity 303. In operation 323, the CN entity 303 may transmit a path switch request response message to the BS 302B. In operation 325, the BS 302B may transmit a UE context release message to the BS 302A to trigger the release of the UE resources associated with the UE 301 at the BS 302A.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
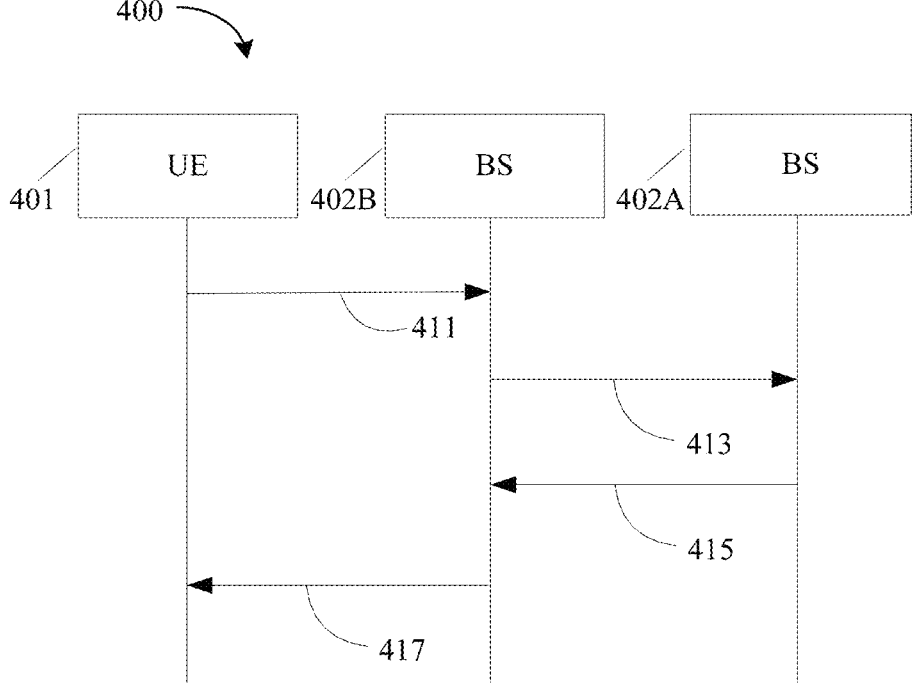
FIG. 4 illustrates a flow chart of an exemplary reestablishment procedure according to some embodiments of the present disclosure.

FIG. 4 illustrates a flow chart of an exemplary reestablishment procedure 400 according to some embodiments of the present disclosure. Details described in all of the foregoing embodiments of the present disclosure are applicable for the embodiments shown in FIG. 4.

Similar to the reestablishment procedure 300 in FIG. 3, the procedure 400 may occur, for example, in response to an RLF on a radio link between UE 401 and BS 402A (i.e., source BS). The UE 401 may select a target BS (e.g., BS 402B) to reestablish the radio link. The UE 401 may function as the UE 101a or UE 101b shown in FIG. 1, or UE 210 shown in FIG. 2. The BS 402A and BS 402B may function as the BS 102 shown in FIG. 1, or BS 220 or satellite 240 shown in FIG. 2.

Operations 411 and 413 in reestablishment procedure 400 correspond to operations 311 and 313 in reestablishment procedure 400 in FIG. 3. For example, in operation 411, the UE 401 may transmit an RRC reestablishment request message to the BS 402B. The UE 401 may start a timer (e.g., T301) associated with the RRC reestablishment request message in response to the transmission of the RRC reestablishment request message. In operation 413, the BS 402B may transmit a request to the BS 402A to retrieve the UE context of the UE 401 if the UE context is not available at the BS 402B.

The BS 402A may fail to find the UE context of the UE 401 based on the C-RNTI, PCI, and E-UTRAN cell identifier. In this case, the BS 402A may transmit, in operation 415, a retrieve UE context failure message to the BS 402B. The BS 402B may fail to the RRC connection resume procedure or reestablishment procedure. In operation 417, the BS 402B may transmit an RRC reestablishment failure message to the UE 401. The UE 401 may stop the timer (e.g., T301) associated with the RRC reestablishment request message in response to the RRC reestablishment failure message.

It should be appreciated by persons skilled in the art that the sequence of the operations in exemplary procedure 400 may be changed and some of the operations in exemplary procedure 400 may be eliminated or modified, without departing from the spirit and scope of the disclosure.

It should also be appreciated by persons skilled in the art that the above reestablishment procedure as described above or as will be described below can be applied to various communication systems including, but not limited to, NR systems, NB-IoT systems, and NTN systems (e.g., wireless communication system 200).

In some embodiments of the present disclosure, a UE may enter an idle mode in response to a reestablishment failure. After the UE reconnects to the network (e.g., a BS), the UE may transmit a failure report (e.g., RLF report) to the BS. The RLF report may include information related to the reestablishment failure, and any other necessary information.

Figure 5:
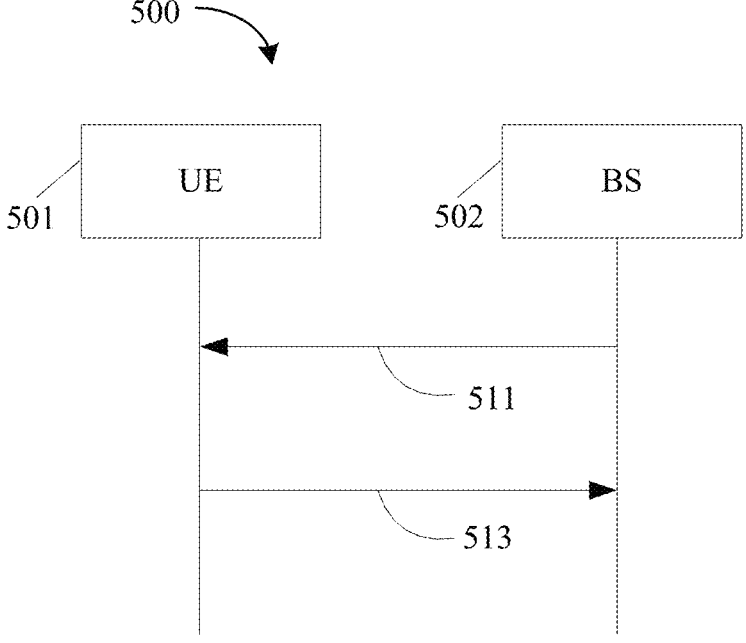
FIG. 5 illustrates a flow chart of an exemplary UE information procedure according to some embodiments of the present disclosure.

FIG. 5 illustrates a flow chart of an exemplary UE information procedure 500 according to some embodiments of the present disclosure.

In FIG. 5, UE 501 may function as the UE 101a or UE 101b shown in FIG. 1, or UE 210 shown in FIG. 2. The BS 502 may function as the BS 102 shown in FIG. 1, or BS 220 or satellite 230 shown in FIG. 2. Details described in all of the foregoing embodiments of the present disclosure are applicable for the embodiments shown in FIG. 5.

The procedure in FIG. 5 may be used by the network (e.g., a BS) to request a UE to report information. For example, in some embodiments of the present disclosure, a UE (e.g., UE 501 in FIG. 5) may report to its serving cell (e.g., BS 502 in FIG. 5) that RLF information is available. The BS 502 may then initiate a UE information procedure. In some embodiments of the present disclosure, the network (e.g., the BS 502) may initiate a UE information procedure only after successful security activation.

Referring to FIG. 5, the BS 502 may initiate the UE information procedure by transmitting a UE information request message to the UE 501 in operation 511. In response to the UE information request message, the UE 501 may respond a UE information response message to the BS 502. The UE information response message may include an RLF report.

It should be appreciated by persons skilled in the art that the sequence of the operations in exemplary procedure 500 may be changed and some of the operations in exemplary procedure 500 may be eliminated or modified, without departing from the spirit and scope of the disclosure.

In some embodiments of the present disclosure, a radio link failure (RLF) indication procedure is introduced to enable mobility robustness and RLF recovery improvement in radio access networks (RANs) such as E-UTRAN or next-generation RAN (NG-RAN). For example, the procedure may include passing information about a failure event over an Xn (e.g., X2) interface.

More specifically, when, for example, a reestablishment request is received or a connection failure is reported after an RRC connection setup or an incoming successful handover, a currently serving BS (e.g., BS #2) of a UE may use the cell identifiers provided by the UE to identify the potential previous serving cell/BS (e.g., BS #1). BS #2 which has received the information about the failure (e.g., an RLF report) may transmit a failure indication (e.g., RLF indication) message to BS #1. The RLF indication message may include the RLF report. After receiving the RLF indication message, BS #1 may match the correct context, or use the information available in the RLF report (if included in the RLF indication message) to analyze the possible root cause of the failure. In some embodiments of the present disclosure, when BS #1 matches the correct context, it may trigger a handover preparation procedure towards BS #2 which initiates the RLF indication cause of the failure procedure. BS #1 may take into account a number of factors (e.g., the circuit switched fallback (CSFB) indicator in the UE context) to determine whether to trigger the handover preparation procedure.

Figure 6:
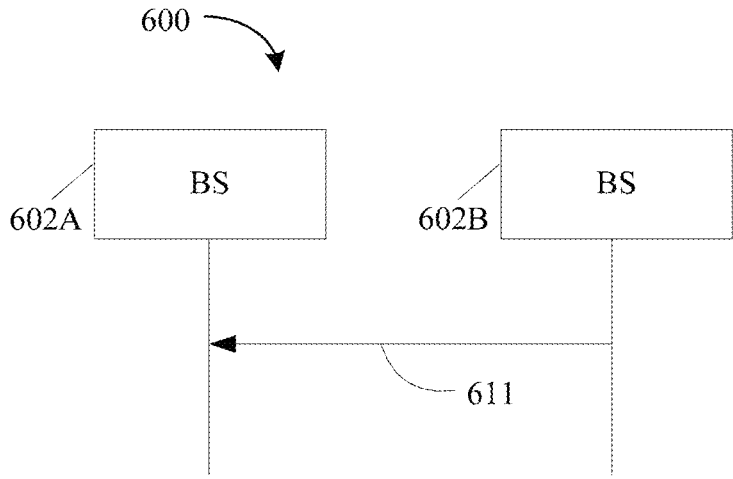
FIG. 6 illustrates a flow chart of an exemplary radio link failure (RLF) indication procedure according to some embodiments of the present disclosure.

FIG. 6 illustrates a flow chart of an exemplary RLF indication procedure 600 according to some embodiments of the present disclosure.

In FIG. 6, BS 602A and BS 602B may function as the BS 102 shown in FIG. 1, or BS 220 or satellite 230 shown in FIG. 2. Details described in all of the foregoing embodiments of the present disclosure are applicable for the embodiments shown in FIG. 6.

Referring to FIG. 6, in response to a reestablishment attempt or the reception of the UE information (e.g., an RLF report) from a UE, the BS 602B may initiate the procedure 600 when, for example, the BS 602B considers that the UE may have previously suffered from a connection failure at a cell controlled by the BS 602A. For example, in operation 611, the BS 602B may initiate the procedure 600 by transmitting a failure indication message to the BS 602A.

In some embodiments of the present disclosure, the failure indication message may include a container of an RLF report. The container of the RLF report may include an RLF report received from the UE at the BS 602B. In some examples, the failure indication message may include a NB-IoT RLF Report Container information element (IE) to indicate the container of the RLF report. The RLF report may enable the BS 602A to determine the nature of the failure. When the container of the RLF report is included in the failure indication message sent after a successful reestablishment, the failure indication message may further indicate an identity (e.g., E-UTRAN cell global identifier (ECGI)) of the cell where the reestablishment has succeeded. In some examples, the failure indication message may include a Re-establishment Cell ECGI IE to indicate the identity of the cell.

In some embodiments of the present disclosure, the failure indication message may include the following information:

Message Type

Failure Cell ID: PCI of the cell in which the UE was connected prior to the failure occurrence;

Re-establishment Cell ECGI: ECGI of the cell where an RRC reestablishment attempt is made or the reestablishment has succeeded;

C-RNTI: C-RNTI contained in the RRC reestablishment request message (specified in 3GPP specification TS 36.331);

shortMAC-I (optional): ShortMAC-I contained in the RRC reestablishment request message (specified in 3GPP specification TS 36.331);

UE RLF Report Container (optional): RLF-Report-r9 IE contained in the UE information response message (specified in 3GPP specification TS 36.331);

RRC Conn Setup Indicator (optional): included when the RLF report within the UE RLF Report Container IE is retrieved after an RRC connection setup or an incoming successful handover;

RRC Conn Reestab Indicator (optional): the reestablishment cause in an RRC connection reestablishment request message (specified in 3GPP specification TS 36.331);

UE RLF Report Container for extended bands (optionally): RLF-Report-v9e0 IE contained in the UE information response message (specified in 3GPP specification TS 36.331);

NB-IoT RLF Report Container (optionally): RLF-Report-NB-r16 IE contained in the UE information response NB message (specified in 3GPP specification TS 36.331).

A radio link can be established in the above-mentioned wireless communication systems to provide a service(s) (e.g., voice, data, or other(s)) to a UE. However, the radio link may fail due to various factors. When a link failure is detected, the UE can request radio link reestablishment. However, the reestablishment procedure can be time-consuming and may cause latency in a wireless communication system. To reduce reestablishment latency, embodiments of the present disclosure propose a conditional reestablishment procedure, which may be triggered before a radio link failure (RLF) happens. In addition, a command-based reestablishment procedure is proposed in the present disclosure. More details on the embodiments of the present disclosure will be illustrated in the following text in combination with the appended drawings.

Figure 7:
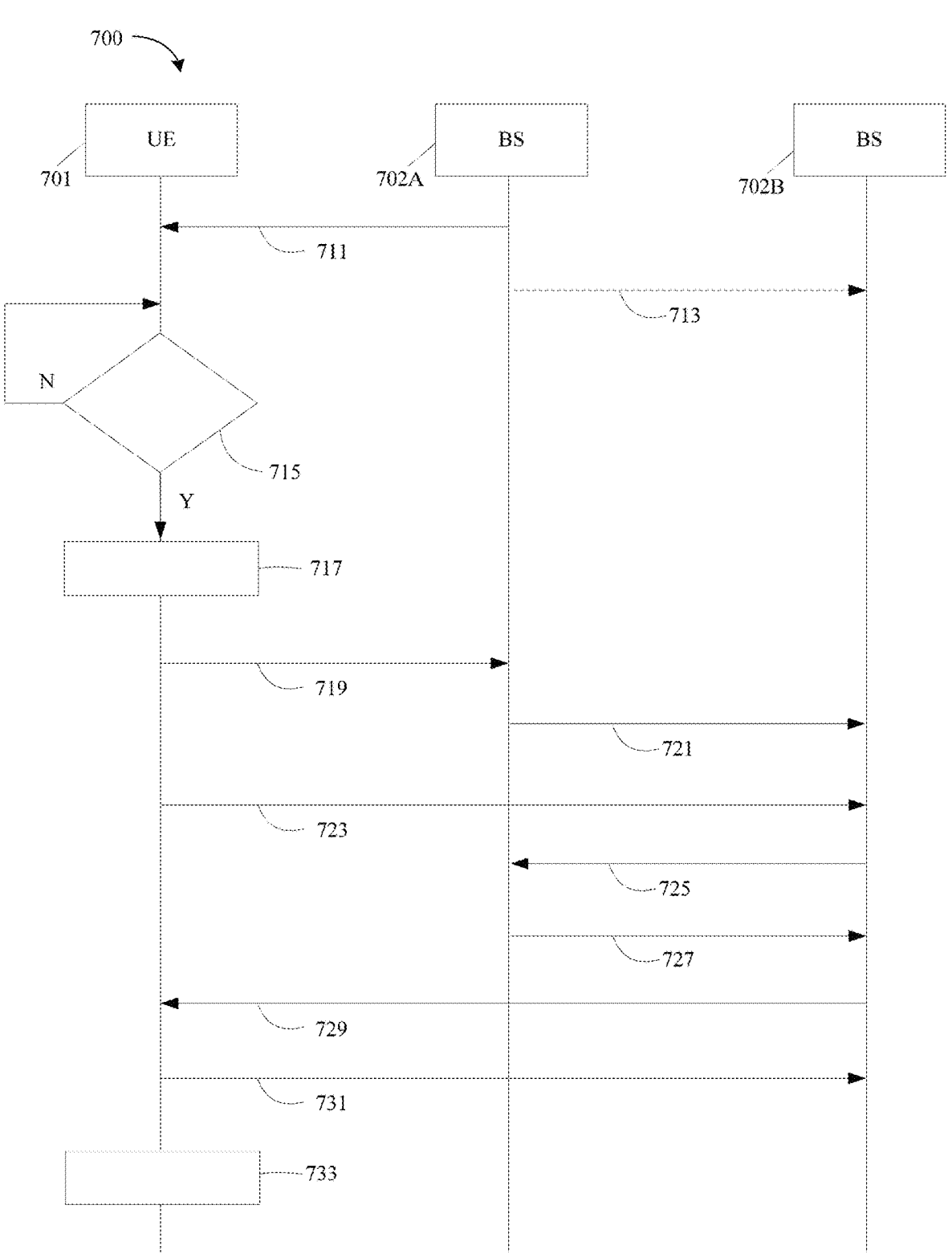
FIG. 7 illustrates a flow chart of an exemplary reestablishment procedure according to some embodiments of the present disclosure.

FIG. 7 illustrates a flow chart of an exemplary reestablishment procedure 700 according to some embodiments of the present disclosure.

In FIG. 7, UE 701 may function as the UE 101*a* or UE 101*b* shown in FIG. 1, or UE 210 shown in FIG. 2. BS 702A and BS 702B may function as the BS 102 shown in FIG. 1, or BS 220 or satellite 270 shown in FIG. 2. Details described in all of the foregoing embodiments of the present disclosure are applicable for the embodiments shown in FIG. 7.

Referring to FIG. 7, the UE 701 may access the BS 702A (i.e., serving BS or source BS), and may be connected to a cell (i.e., a serving cell) of the BS 702A. The BS 702A may determine to apply a conditional reestablishment for the UE 701. In operation 711, the BS 702A may transmit conditional reestablishment configuration information to the UE 701. The conditional reestablishment configuration information may indicate a set of execution conditions for a set of candidate cells. Each candidate cell of the set of candidate cells may be associated with at least one execution condition. The set of candidate cells may include at least one cell of at least one potential target BS.

For example, the conditional reestablishment configuration information may indicate a candidate cell A and a candidate cell B, and at least one execution condition for each of the candidate cell A and candidate cell B. The execution conditions for the candidate cell A and candidate cell B may be the same or different. The candidate cell A and candidate cell B may be from the same or different BSs.

In some embodiments of the present disclosure, the procedure 700 may include operation 713 (denoted by dotted arrow as an option). In operation 713, the BS 702A may transmit a message including the UE context of the UE 701 to at least one candidate cell (e.g., BS 702B) of the set of candidate cells. The UE context may be transmitted to some or all of the candidate cells in the set of candidate cells. In some examples, the transmission of the UE context may occur in response to the transmission of the conditional reestablishment configuration information. In some other examples, the transmission of the UE context may occur prior to the transmission of the conditional reestablishment configuration information.

In operation 715, in response to the reception of the conditional reestablishment configuration information from the serving cell of the BS 702A, the UE 701 may evaluate the set of execution conditions based on the conditional reestablishment configuration information. For example, for each candidate cell, the UE may evaluate whether the associated condition(s) is fulfilled or not, and may determine whether a corresponding candidate cell satisfies a reestablishment condition based on the evaluation.

In some embodiments of the present disclosure, the set of candidate cells may include a candidate cell (e.g., candidate cell A) which is associated with at least two execution conditions. In some instances, the candidate cell A satisfies a reestablishment condition when all of the at least two execution conditions associated with the candidate cell A is fulfilled. In some other instances, the candidate cell A satisfies a reestablishment condition when one of the at least two execution conditions associated with the candidate cell is fulfilled. In some embodiments of the present disclosure, the set of candidate cells may include a candidate cell (e.g., candidate cell B) associated with one execution condition. The candidate cell B satisfies a reestablishment condition when the associated execution condition is fulfilled.

In response to a candidate cell (e.g., a cell of BS 702B, hereinafter referred to as "candidate cell C") of the set of candidate cells satisfying a reestablishment condition, the UE 701 may go to operation 717. In operation 717, the UE 701 may initiate a reestablishment procedure and may stop a link establishment timer (e.g., timer T312) if the link establishment timer is running. In some embodiments of the present disclosure, the UE 701 may stop evaluating the set of execution conditions in response to the candidate cell C satisfying a reestablishment condition.

Since in the above scenario, the reestablishment procedure is initiated due to a satisfied reestablishment condition, such reestablishment procedure may be referred to as a "conditional reestablishment procedure" in the subject disclosure. However, in view of the context, persons skilled in the art would comprehend that a "reestablishment procedure" may refer to either a normal reestablishment procedure that is initiated due to, for example, an RLF (e.g., the one shown in FIG. 3), or a conditional reestablishment procedure.

In some examples, a UE may stop evaluating the set of execution conditions in response to one (e.g., candidate cell C) of the set of candidate cells satisfying the corresponding reestablishment condition. In some examples, a UE may stop evaluating the set of execution conditions in response to a number of candidate cells satisfying the corresponding reestablishment conditions.

In some embodiments of the present disclosure, in response to a reestablishment condition being satisfied or the initiation of a conditional reestablishment procedure, the UE 701 may inform its serving cell that it is leaving. This is beneficial because it could allow the serving cell to provide the UE context of the UE 701 to a target cell in advance and thus reduce reestablishment latency.

For example, referring to FIG. 7, in operation 719, the UE 701 may transmit an RRC message to BS 702A. The RRC message may include an indicator indicating that the UE 701 is leaving. The RRC message may further include an identity of the candidate cell C.

In some embodiments of the present disclosure, in the case that a reestablishment condition is satisfied immediately after the reception of the conditional reestablishment configuration information, the UE 701 may skip the transmission of the above RRC message. That is, in such scenario, operation 719 may be omitted.

In some embodiments of the present disclosure, in the case that a reestablishment condition is satisfied immediately after the reception of the conditional reestablishment configuration information, the UE 701 may transmit the above RRC message upon the satisfaction of the reestablishment condition.

After receiving the RRC message indicating the leaving of the UE 701, the BS 702A may transmit the UE context of the UE 701 in operation 721. In operations 723-731, the UE 701 may perform a reestablishment procedure similar to the exemplary reestablishment procedure 300 as described above.

For example, in operation 723, the UE 701 may transmit a reestablishment request message to the BS 702B. The UE 701 may start a timer (e.g., T301) associated with the reestablishment request message in response to the transmission of the reestablishment request message.

After receiving the reestablishment request message, the BS 702B may determine whether to retrieve the UE context of the UE 701. In the case that the BS 702B determines that the UE context of the UE 701 is not locally available, the BS 702B may transmit a retrieve UE context request message to the BS 702A in operation 725, as described above with respect to FIG. 3. In response to the retrieve UE context request message, the BS 702A may transmit a retrieve UE context response message to the BS 702B, in operation 727, as described above with respect to FIG. 3. Operations 725 and 727 may be omitted when the UE context of the UE 701 is available at the BS 702B.

In response to the reestablishment request message, the BS 702B may transmit a reestablishment message to the UE 701 in operation 729. The UE 701 may stop the timer (e.g., T301) associated with the reestablishment request message in response to the reestablishment message. In operation 731, the UE 701 may transmit a reestablishment complete message to the BS 702B. The BS 702B may perform a path switch procedure with a CN entity (not shown in FIG. 7), as described above with respect to FIG. 3. The CN entity may be a MME or an AMF.

In some embodiments of the present disclosure, in response to successfully accessing the candidate cell C, the UE 701 may release the conditional reestablishment configuration information configured by the previous serving BS or cell (e.g., BS 702A) in operation 733.

It should be appreciated by persons skilled in the art that the sequence of the operations in exemplary procedure 700 may be changed and some of the operations in exemplary procedure 700 may be eliminated or modified, without departing from the spirit and scope of the disclosure. For example, although operation 719 is performed after operation 717 in exemplary procedure 700, it is contempt that operation 719 may be performed prior to or at the same time as operation 717.

Although a successful conditional reestablishment procedure is shown in FIG. 7, in some embodiments of the present disclosure, similar to the exemplary procedure 400 in FIG. 4, a conditional reestablishment procedure may fail. For example, a conditional reestablishment procedure may fail in response to the expiry of the timer (e.g., T301) associated with the reestablishment request message. The UE 701 may enter an idle mode in response to the failure of the conditional reestablishment procedure.

In some embodiments of the present disclosure, the idle UE 701 may try to connect to a new cell from the idle mode. After the UE 701 connects to a new cell, the UE 701 may transmit an RLF report to the new cell to indicate the above reestablishment failure. This is beneficial because it may optimize the mobility robustness of the network.

Figure 8:
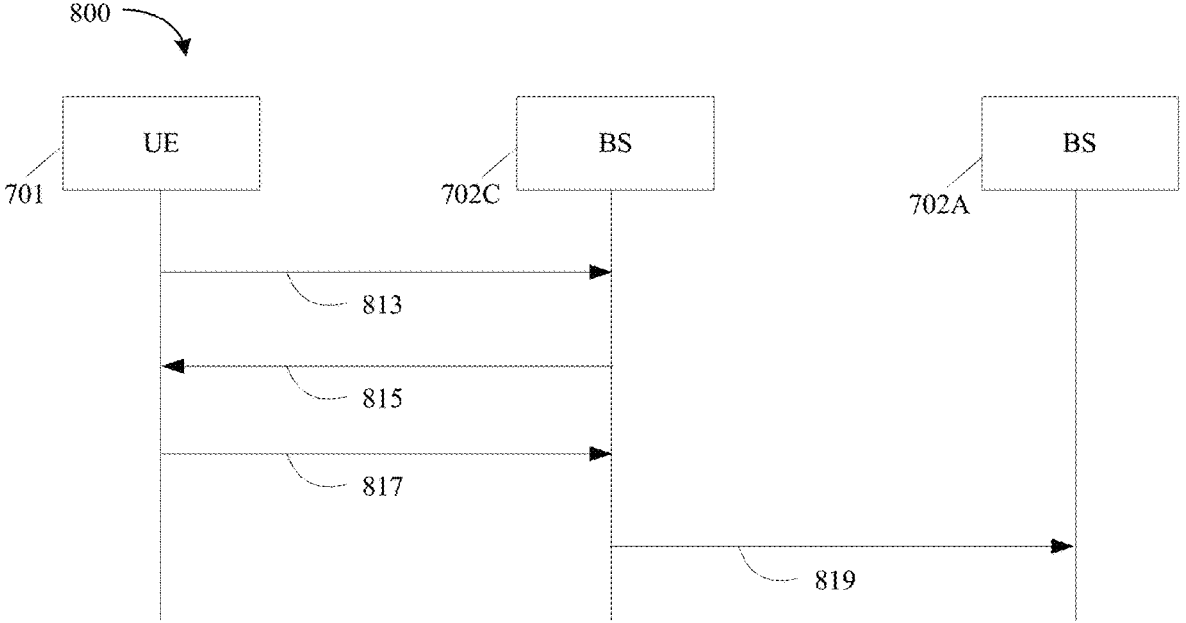
FIG. 8 illustrates a flow chart of an exemplary wireless communication procedure according to some embodiments of the present disclosure.

FIG. 8 illustrates a flow chart of an exemplary wireless communication procedure 800 according to some embodiments of the present disclosure. The procedure 800 may occur after the UE 701 accesses a new cell.

Referring to FIG. 8, in operation 813, in response to connecting to a new cell (e.g., BS 702C), the UE 701 may report to the BS 702C that RLF information is available. The BS 702C may then initiate a UE information procedure. For example, the BS 702C may transmit a UE information request message to the UE 701 in operation 815. In response to the UE information request message, the UE 701 may transmit an RLF report to the BS 702C in operation 817. The RLF report may be included in a UE information response message.

In some embodiments of the present disclosure, an RLF report may include a failure cause indicating the type of a failure at a UE. For example, the failure cause may indicate whether the failure at the UE is due to an RLF, a handover (HO) failure, a conditional HO (CHO) failure, or a conditional reestablishment failure.

The RLF report transmitted by the UE 701 may include a failure cause indicating a conditional reestablishment failure. The RLF report may further indicate the identity of the candidate cell (e.g., candidate cell C as described with respect to FIG. 7) where the UE 701 fails to perform the conditional reestablishment. The RLF report may further indicate the identity of the original serving cell of the original BS (e.g., BS 702A in FIG. 7) which configures the conditional reestablishment for the UE 701. The identity of a cell may be an ECGI or PCI.

In response to the RLF report, the BS 702C may initiate an RLF indication procedure, as described above with respect to FIG. 6. For example, the BS 702C may transmit a failure indication message to the BS 702A in operation 819.

In some embodiments of the present disclosure, a failure indication message may include a container of an RLF report. For example, the failure indication message transmitted from the BS 702C to the BS 702A may include a container of an RLF report, which can include the RLF report received from the UE 701.

In some embodiments of the present disclosure, a failure indication message may further include a connection reestablishment indicator. For example, the connection reestablishment indicator may indicate whether the failure at the UE is due to a reconfiguration failure, a HO Failure, a conditional reestablishment failure, or other failures. The connection reestablishment indicator may be may be based on the failure cause in the RLF report. For example, the failure indication message transmitted from the BS 702C to the BS 702A may include a connection reestablishment indicator indicating a conditional reestablishment failure.

After receiving the failure indication message, the BS 702A may determine the cause of the failure at the UE 701, thereby achieving an MRO in the network.

In some embodiments of the present disclosure, the BS 702C may be a BS different from either the BS 702A or the BS 702B. In some embodiments of the present disclosure, the BS 702C may be the BS 702B. In some embodiments of the present disclosure, the BS 702C may be the BS 702A. In these embodiments, operation 819 may be omitted.

It should be appreciated by persons skilled in the art that the sequence of the operations in exemplary procedure 800 may be changed and some of the operations in exemplary procedure 800 may be eliminated or modified, without departing from the spirit and scope of the disclosure.

In some embodiments of the present disclosure, a UE may detect or declare an RLF before a reestablishment condition is satisfied at the UE. After the UE reestablishes a connection with a new cell, the UE may report an RLF report to the new cell to indicate that the conditional reestablishment configured at the UE is not triggered.

Figure 9:
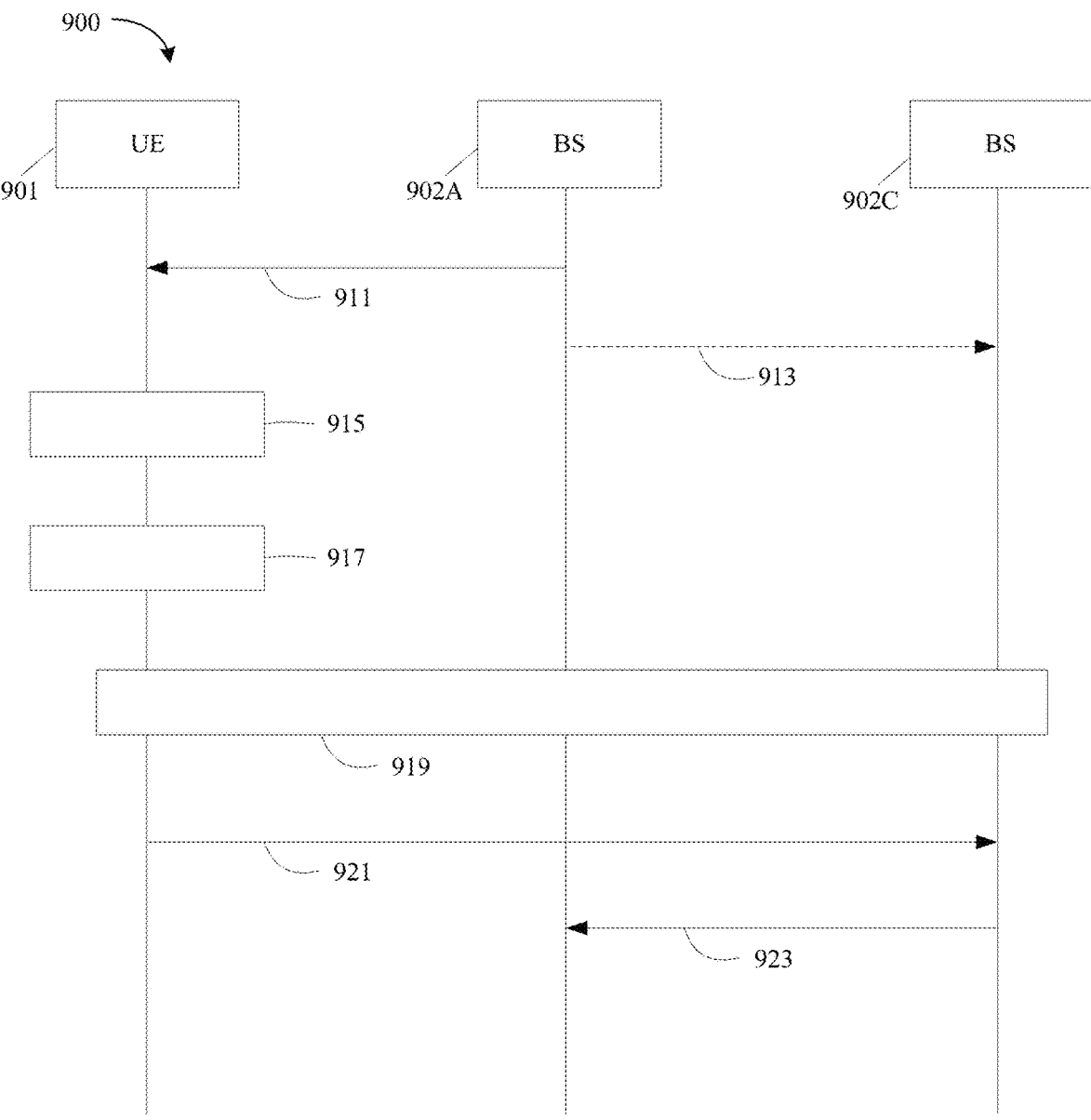
FIG. 9 illustrates a flow chart of an exemplary wireless communication procedure according to some embodiments of the present disclosure.

FIG. 9 illustrates a flow chart of an exemplary wireless communication procedure 900 according to some embodiments of the present disclosure.

In FIG. 9, UE 901 may function as the UE 101a or UE 101b shown in FIG. 1, or UE 210 shown in FIG. 2. BS 902A and BS 902C may function as the BS 102 shown in FIG. 1, or BS 220 or satellite 290 shown in FIG. 2. Details described in all of the foregoing embodiments of the present disclosure are applicable for the embodiments shown in FIG. 9.

Referring to FIG. 9, the UE 901 may access the BS 902A (i.e., serving BS or source BS), and may be connected to a cell (i.e., a serving cell) of the BS 902A. The BS 902A may determine to apply a conditional reestablishment for the UE 901. For example, similar to operation 711 as described with respect to FIG. 7, the BS 902A may transmit conditional reestablishment configuration information to the UE 901 in operation 911. The conditional reestablishment configuration information may indicate a set of execution conditions for a set of candidate cells.

In some embodiments of the present disclosure, similar to operation 713 as described with respect to FIG. 7, the procedure 900 may include operation 913 (denoted by dotted arrow as an option). In operation 913, the BS 902A may transmit a message including the UE context of the UE 901 to at least one candidate cell of the set of candidate cells.

Similar to operation 715 as described with respect to FIG. 7, in response to the reception of the conditional reestablishment configuration information, the UE 901 may evaluate the set of execution conditions based on the conditional reestablishment configuration information in operation 915.

In some embodiments of the present disclosure, before any candidate cell satisfies a reestablishment condition, the UE 901 may detect or declare an RLF in operation 917. In some embodiments of the present disclosure, the UE 901 may stop evaluating the set of execution conditions in response to the RLF. In some embodiments of the present disclosure, the UE 901 may release the conditional reestablishment configuration information in response to the RLF.

In some embodiments of the present disclosure, the UE 901 may initiate a reestablishment procedure in response to the RLF. For example, in operation 919, the UE 901 may perform a reestablishment procedure similar to the procedure 300 shown in FIG. 3 and may connect to the BS 902C. In some embodiments of the present disclosure, in response to connecting to the BS 902C, the UE 901 may initiate a procedure to report an RLF report to the BS 902C. In some examples, the UE 901 may initiate a procedure similar to the procedure 800 shown in FIG. 8.

For instance, in operation 921, the UE 901 may transmit an RLF report to the BS 902C in response to connecting to the BS 902C. The RLF report transmitted by the UE 901 may include a failure cause indicating an RLF. The RLF report may further include an indicator indicating that no conditional reestablishment is triggered at the UE 901. In some embodiments of the present disclosure, the RLF report may further include the conditional reestablishment configuration information configured for the UE 901. For example, the RLF report may include the set of execution conditions and the set of candidate cells. In some embodiments of the present disclosure, the RLF report may further include the identity of the original serving cell of the original BS (e.g., BS 902A in FIG. 9) which configures the conditional reestablishment for the UE 901. The identity of a cell may be an ECGI or PCI.

In response to the RLF report, the BS 902C may transmit a failure indication message to the BS 902A in operation 923. In some embodiments of the present disclosure, the failure indication message transmitted by the BS 902C may include a container of an RLF report, which can include the RLF report received from the UE 901. In some embodiments of the present disclosure, the failure indication message transmitted by the BS 902C may further include a connection reestablishment indicator, which may be may be based on the failure cause in the RLF report. For example, the failure indication message transmitted by the BS 902C may include a connection reestablishment indicator indicating an RLF.

After receiving the failure indication message, the BS 902A may determine the cause of the failure at the UE 901, thereby achieving an MRO in the network.

In some embodiments of the present disclosure, the BS 902C may be the same as or different from the BS 902A. In the case that the BS 902C is the BS 902A, operation 923 may be omitted.

It should be appreciated by persons skilled in the art that the sequence of the operations in exemplary procedure 900 may be changed and some of the operations in exemplary procedure 900 may be eliminated or modified, without departing from the spirit and scope of the disclosure.

In some embodiments of the present disclosure, to enhance the reestablishment procedure and reduce the interruption time, a command-based reestablishment procedure may be employed. The command-based reestablishment procedure may be applied to various wireless communication networks and various UEs as described above. For example, a BS may order an IoT device or an NB-IoT device) to perform a reestablishment procedure.

Figure 10:
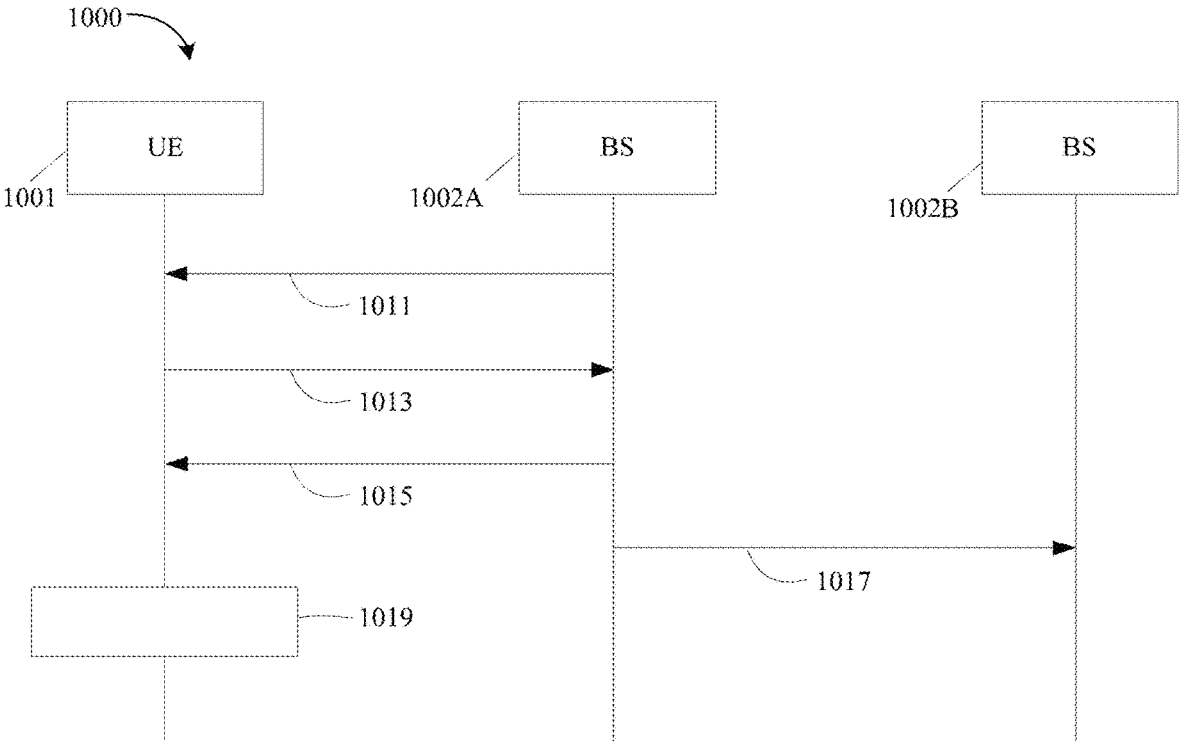
FIG. 10 illustrates a flow chart of an exemplary reestablishment procedure according to some embodiments of the present disclosure.

FIG. 10 illustrates a flow chart of an exemplary reestablishment procedure 1000 according to some embodiments of the present disclosure. Details described in all of the foregoing embodiments of the present disclosure are applicable for the embodiments shown in FIG. 10.

In FIG. 10, UE 1001 may function as the UE 101a or UE 101b shown in FIG. 1, or UE 210 shown in FIG. 2. The BS 1002A and BS 1002B may function as the BS 102 shown in FIG. 1, or BS 220 or satellite 2100 shown in FIG. 2. Details described in all of the foregoing embodiments of the present disclosure are applicable for the embodiments shown in FIG. 10.

Referring to FIG. 10, in operation 1011, the UE 1001 may receive information related to measurement configuration from its serving BS (e.g., the BS 1002A). In operation 1013, the UE 1001 may report a measurement report to the BS 1002A. The measurement report may include measurement results based on the measurement configuration.

The BS 1002A may determine to command the UE 1001 to perform a reestablishment procedure based on the measurement result. In operation 1015, the BS 1002A may transmit a reestablishment command to the UE 1001. The reestablishment command may indicate at least one candidate cell. For example, the reestablishment command may include the cell ID of the at least one candidate cell. The BS 1002A may transmit the UE context of the UE 1001 to all or some of the at least one candidate cell. For example, BS 1002A may transmit the UE context of the UE 1001 to a candidate cell D (e.g., BS 1002B) in operation 1017.

In response to the reestablishment command, the UE 1001 may initiate a reestablishment procedure in operation 1019. In some embodiments of the present disclosure, the UE 1001 may not start a timer (e.g., Timer T311) associated with the reestablishment initiation.

In some embodiments of the present disclosure, the at least one candidate cell in the reestablishment command may include a plurality of candidate cells. In these embodiments, the UE 1001 may select a target cell from the plurality of candidate cells, and then try to access the target cell. The UE 1001 may perform the cell selection according to certain criteria. For example, the UE 1001 may select the target cell based on the channel qualities. The channel quality between the UE and the target cell may be the best one among the channel qualities between the UE and the plurality of candidate cells.

In some embodiments of the present disclosure, the UE 1001 may be configured with a conditional reestablishment. In some examples, the UE 1001 may stop evaluating the configuration for the conditional reestablishment (e.g., a set of execution conditions) in response to the reestablishment command. In some examples, the UE 1001 may release the configuration for the conditional reestablishment in response to the reestablishment command.

It should be appreciated by persons skilled in the art that the sequence of the operations in exemplary procedure 1000 may be changed and some of the operations in exemplary procedure 1000 may be eliminated or modified, without departing from the spirit and scope of the disclosure.

Figure 11:
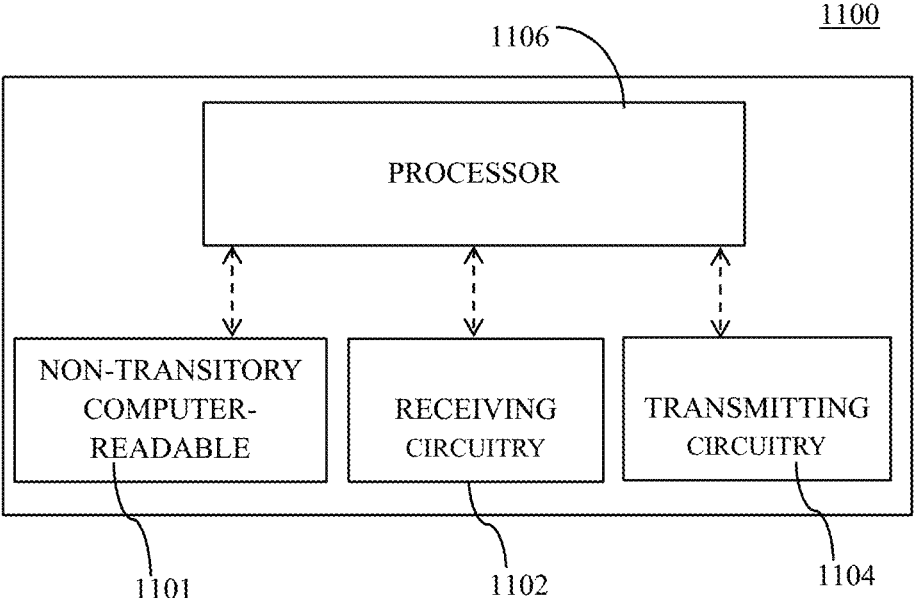
FIG. 11 illustrates a block diagram of an exemplary apparatus according to some embodiments of the present disclosure.

FIG. 11 illustrates a block diagram of an exemplary apparatus 1100 according to some embodiments of the present disclosure.

As shown in FIG. 11, the apparatus 1100 may include at least one non-transitory computer-readable medium 1101, at least one receiving circuitry 1102, at least one transmitting circuitry 1104, and at least one processor 1106 coupled to the non-transitory computer-readable medium 1101, the receiving circuitry 1102 and the transmitting circuitry 1104. The apparatus 1100 may be a network side apparatus (e.g., a terrestrial BS or a satellite), or a communication device (e.g., a UE).

Although in this figure, elements such as the at least one processor 1106, transmitting circuitry 1104, and receiving circuitry 1102 are described in the singular, the plural is contemplated unless a limitation to the singular is explicitly stated. In some embodiments of the present application, the receiving circuitry 1102 and the transmitting circuitry 1104 are combined into a single device, such as a transceiver. In certain embodiments of the present application, the apparatus 1100 may further include an input device, a memory, and/or other components.

In some embodiments of the present disclosure, the non-transitory computer-readable medium 1101 may have stored thereon computer-executable instructions to cause a processor to implement the method with respect to the UE as described above. For example, the computer-executable instructions, when executed, cause the processor 1106 interacting with receiving circuitry 1102 and transmitting circuitry 1104, so as to perform the operations with respect to the UE depicted in FIGS. 3-5 and 7-10.

In some embodiments of the present disclosure, the non-transitory computer-readable medium 1101 may have stored thereon computer-executable instructions to cause a processor to implement the method with respect to the BS or the satellite as described above. For example, the computer-executable instructions, when executed, cause the processor 1106 interacting with receiving circuitry 1102 and transmitting circuitry 1104, so as to perform the operations with respect to the BS (including terrestrial BSs, satellites or the like) depicted in FIGS. 3-10

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. An apparatus for wireless communication, comprising:
at least one memory; and
at least one processor coupled with the at least one memory and configured to cause the apparatus to:
transmit a measurement report to a first base station (BS);
receive, from a cell of the first BS, a command to perform a conditional reestablishment procedure and conditional reestablishment configuration information indicating a set of execution conditions for a set of candidate cells for the conditional reestablishment procedure; and
evaluate the set of execution conditions for the set of candidate cells based on the conditional reestablishment configuration information in response to the reception of the conditional reestablishment configuration information; and
initiate the conditional reestablishment procedure in response to a first candidate cell of the set of candidate cells satisfying a reestablishment condition.

2. The apparatus of claim 1, wherein the at least one processor is further configured to cause the apparatus to:
stop evaluating the set of execution conditions in response to the first candidate cell of the set of candidate cells satisfying the reestablishment condition.

3. The apparatus of claim 1, wherein the at least one processor is further configured to cause the apparatus to:
transmit a radio resource control (RRC) message to the first BS in response to the initiation of the conditional reestablishment procedure, wherein the RRC message comprises an indicator indicating that the UE is leaving the first BS and an identity of the first candidate cell.

4. The apparatus of claim 1, wherein the at least one processor is further configured to cause the apparatus to:
transmit a radio resource control (RRC) message to the first BS in response to a first candidate cell of the set of candidate cells satisfying a reestablishment condition, wherein the RRC message comprises an indicator indicating that the UE is leaving the first BS and an identity of the first candidate cell.

5. The apparatus of claim 1, wherein the at least one processor is further configured to cause the apparatus to:
release the conditional reestablishment configuration information in response to successfully accessing the first candidate cell.

6. The apparatus of claim 1, wherein the at least one processor is further configured to cause the apparatus to:
enter an idle mode in response to a failure of the conditional reestablishment procedure.

7. The apparatus of claim 1, wherein the at least one processor is further configured to cause the apparatus to:
declare a radio link failure (RLF) at the apparatus before any candidate cell satisfies a reestablishment condition.

8. An apparatus for wireless communication, comprising:
at least one memory; and
at least one processor coupled with the at least one memory and configured to cause the apparatus to:
transmit a measurement report;
receive a reestablishment command that includes:
a command to perform a conditional reestablishment procedure; and conditional reestablishment configuration information indicating a set of execution conditions for a set of candidate cells for the conditional reestablishment procedure; and
initiate the reestablishment procedure in response to the reception of the reestablishment command.

9. The apparatus of claim 8, wherein the at least one processor is further configured to cause the apparatus to:
not start a timer associated with the reestablishment initiation.

10. The apparatus of claim 8, wherein the at least one processor is further configured to cause the apparatus to:
select a target cell from the set of candidate cells.

11. The apparatus of claim 10, wherein a channel quality between the apparatus and the target cell is a best channel quality for channel qualities between the apparatus and the set of candidate cells.

12. The apparatus of claim 8, wherein the at least one processor is further configured to cause the apparatus to:
stop evaluating the configuration for the conditional reestablishment in response to the reception of the reestablishment command.

13. The apparatus of claim 8, wherein the at least one processor is further configured to cause the apparatus to:
release the configuration for the conditional reestablishment in response to the reception of the reestablishment command.

14. A method performed by an apparatus for wireless communication, the metho comprising:
transmitting a measurement report to a first base station (BS);
receiving, from a cell of the first BS, a command to perform a conditional reestablishment procedure and conditional reestablishment configuration information indicating a set of execution conditions for a set of candidate cells for the conditional reestablishment procedure; and
evaluating the set of execution conditions for the set of candidate cells based on the conditional reestablishment configuration information in response to the reception of the conditional reestablishment configuration information; and
initiating the conditional reestablishment procedure in response to a first candidate cell of the set of candidate cells satisfying a reestablishment condition.

15. The method of claim 14, further comprising:
stopping evaluating the set of execution conditions in response to the first candidate cell of the set of candidate cells satisfying the reestablishment condition.

16. The method of claim 14, further comprising:
transmitting a radio resource control (RRC) message to the first BS in response to the initiation of the conditional reestablishment procedure, wherein the RRC message comprises an indicator indicating that the UE is leaving the first BS and an identity of the first candidate cell.

17. The method of claim 14, further comprising:
transmitting a radio resource control (RRC) message to the first BS in response to a first candidate cell of the set of candidate cells satisfying a reestablishment condition, wherein the RRC message comprises an indicator indicating that the UE is leaving the first BS and an identity of the first candidate cell.

18. The method of claim 14, further comprising:
releasing the conditional reestablishment configuration information in response to successfully accessing the first candidate cell.

19. The method of claim 14, further comprising:

entering an idle mode in response to a failure of the conditional reestablishment procedure.

* * * * *